(12) United States Patent
Hashimoto et al.

(10) Patent No.: US 11,868,571 B2
(45) Date of Patent: Jan. 9, 2024

(54) CAPACITIVE ELECTRONIC PEN INCLUDING DETACHABLE AXIAL CORE BODY

(71) Applicant: Wacom Co., Ltd., Saitama (JP)

(72) Inventors: Yoshiyuki Hashimoto, Saitama (JP); Shinya Aoki, Saitama (JP); Takenori Kaneda, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/975,269

(22) Filed: Oct. 27, 2022

(65) Prior Publication Data
US 2023/0047870 A1 Feb. 16, 2023

Related U.S. Application Data

(63) Continuation of application No. 17/318,800, filed on May 12, 2021, now Pat. No. 11,513,642, which is a (Continued)

(30) Foreign Application Priority Data

Dec. 20, 2018 (JP) ................................. 2018-237879

(51) Int. Cl.
*G06F 3/044* (2006.01)
*G06F 3/0354* (2013.01)

(52) U.S. Cl.
CPC ........ *G06F 3/0442* (2019.05); *G06F 3/03545* (2013.01); *G06F 2203/04105* (2013.01)

(58) Field of Classification Search
CPC ....... G06F 2203/04105; G06F 3/03545; G06F 3/04162; G06F 3/04166; G06F 3/044; G06F 3/0442
See application file for complete search history.

(56) References Cited

U.S. PATENT DOCUMENTS 9,239,639 B1 * 1/2016 Vanderet ............. G06F 3/03545
9,612,671 B1 * 4/2017 Blaszczak ............. G06F 3/0393
(Continued)

FOREIGN PATENT DOCUMENTS

JP  2013-161307 A  8/2013
WO 2013/057862 A1  4/2013
(Continued)

OTHER PUBLICATIONS

International Search Report, dated Dec. 3, 2019, for International Application No. PCT/JP2019/036442, 2 pages.

*Primary Examiner* — Chun-Nan Lin
(74) *Attorney, Agent, or Firm* — Seed IP Law Group LLP (57) ABSTRACT

A capacitive electronic pen includes a housing, a core body, and a peripheral electrode. In the capacitive electronic pen, the core body includes an electrode core formed of a conductor having a spherical section and a shaft center section. The spherical section of the electrode core is not surrounded by the peripheral electrode and is disposed on a tip (distal) end of the capacitive electronic pen protruding from one opening in the axial direction of the housing. The shaft center section of the electrode core has multiple portions that vary in thickness (a cross-section size) including a thin portion, which coupled with the spherical section, and a thick portion. When the core body is fitted to the core body holder, at least a portion of the shaft center section of the electrode core is thinner than the diameter of the spherical section of the electrode core.

14 Claims, 6 Drawing Sheets

Related U.S. Application Data continuation of application No. PCT/JP2019/036442, filed on Sep. 18, 2019.

(56) References Cited

U.S. PATENT DOCUMENTS

| | | |
|---|---|---|
| 2012/0228039 A1 | 9/2012 | Hinson et al. |
| 2013/0199311 A1 | 8/2013 | Horie et al. |
| 2014/0267192 A1 | 9/2014 | Matsuura et al. |
| 2016/0313812 A1 | 10/2016 | Katsurahira |
| 2017/0068340 A1* | 3/2017 | Zimmerman ......... G06F 3/0416 |
| 2017/0177099 A1 | 6/2017 | Tamura |
| 2019/0179432 A1* | 6/2019 | Hsu .................... G06F 3/03545 |

FOREIGN PATENT DOCUMENTS

| | | |
|---|---|---|
| WO | 2015/098486 A1 | 7/2015 |
| WO | 2016/063420 A1 | 4/2016 |

* cited by examiner

FIG. 8B
SOLID-LINE STATE
(PERPENDICULAR)

FIG. 8C
BROKEN-LINE STATE
(INCLINED)

CAPACITIVE ELECTRONIC PEN INCLUDING DETACHABLE AXIAL CORE BODY

BACKGROUND

Technical Field

The present invention relates to a capacitive electronic pen.

Description of the Related Art

A capacitive electronic pen uses capacitive coupling to exchange signals with a position sensor of a position detection device. The position detection device detects a position designated by a pen tip of the electronic pen, by detecting a position on the position sensor that is exchanging signals with the electronic pen through an electric field.

The pen tip of the capacitive electronic pen needs to be electrically conductive in order to achieve capacitive coupling to the position sensor. Therefore, the capacitive electronic pen is configured such that the distal end of a core body (an elongated core member) formed of a conductive material protrudes from an opening of the housing of the electronic pen while an end opposite the distal end of the core body is fitted to a core body holder disposed in the housing and engaged (secured) in the housing of the electronic pen (refer, for example, to WO 2016/063420A1).

In many cases, the core body is mainly formed of a rod-shaped metal having a predetermined thickness (e.g., a predetermined diameter). A certain proposed core body is formed of rod-shaped elastomer or other resin that is made conductive by being mixed with conductive metal powder. The core body formed by using elastomer as the resin is advantageous in that the writing performance (the writing feel) of the electronic pen thus formed can be made to suit writing operation performed to designate a position on an input surface (writing surface) of the position sensor.

The position detection device is preferably suited for various applications and capabilities, such as the capability to detect an inclination angle of the electronic pen with respect to the input surface during writing and using the detected inclination angle for controlling the thickness (stroke width) of handwriting.

Various methods are proposed for detecting an inclination angle of the electronic pen with respect to the input surface. Also known is a method of detecting an inclination angle based on the capacitive coupling between the core body and the position sensor. For example, referring to FIG. 8A, in a case where a rod-shaped core body 100 having a predetermined thickness is used as the core body of the electronic pen, in a state where the core body 100 is perpendicular to the input surface of the position sensor as indicated by a solid line in FIG. 8A, the trace of the designated position based on the capacitive coupling with the core body 100 of the electronic pen is detected as a perfect circle 102 by the position sensor as indicated in FIG. 8B.

Figure 8A:
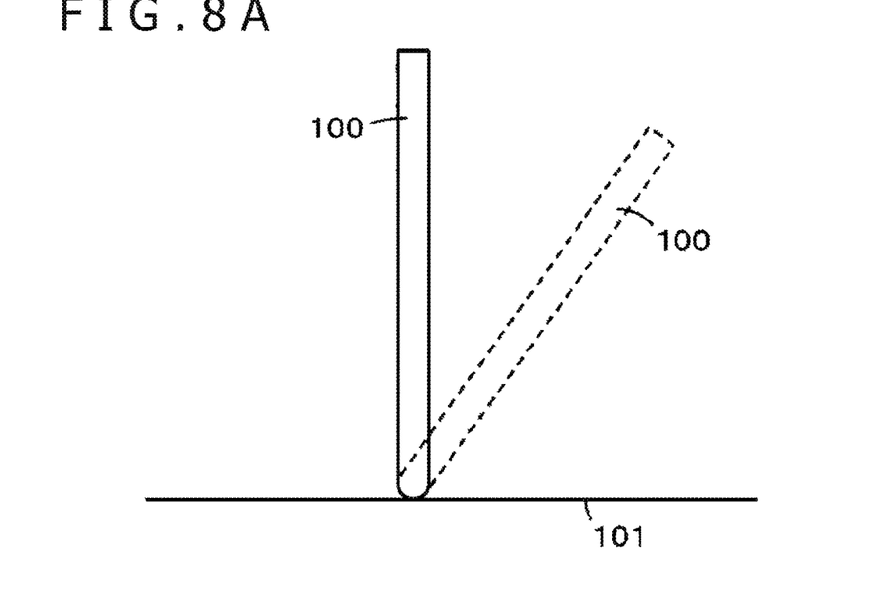
FIGS. 8A to 8C are diagrams illustrating an inclination detection operation performed by a conventional electronic pen.
Figure 8B:
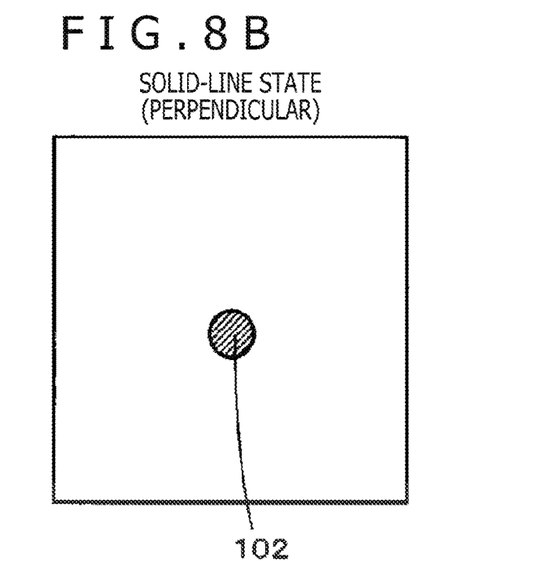
Figure 8C:
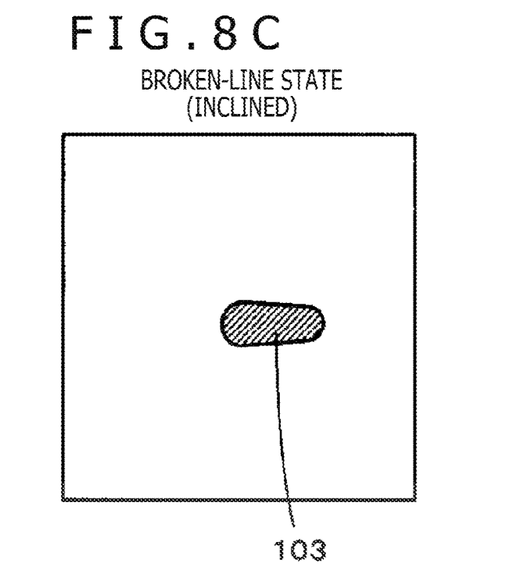

Meanwhile, in a state where the core body 100 is inclined with respect to the input surface of the position sensor as indicated by a broken line in FIG. 8A, the trace of the designated position based on the capacitive coupling with the core body 100 of the electronic pen is detected by the position sensor as an oval 103 that is elongated according to the direction and angle of inclination of the core body 100, as indicated in FIG. 8C. Therefore, the position detection device is capable of detecting the direction and angle of inclination of the electronic pen from the elongated shape (ellipse) of the oval 103.

As is obvious from the above description, in order to detect the inclination angle of the electronic pen with respect to the input surface using the method of detecting the inclination based on the capacitive coupling between the core body and the position sensor, it may be necessary that not only the distal end of the core body but also a portion adjacent to the distal end be capacitively coupled to the position sensor. Further, it may be preferable that not only the distal end of the core body but also a trailing (proximal) end portion that continues from the distal end be thick, i.e., have a large cross-section (e.g., a large diameter).

BRIEF SUMMARY

As described above, the core body formed of elastomer or other resin made conductive is advantageous in that it makes it easy to adjust the feel of writing. However, resin, such as elastomer, is easily deformed. Therefore, when high pen pressure is applied to the pen tip of the electronic pen, the pen tip end of the core body might deform to be caught (stuck) in the opening of the housing of the electronic pen to degrade the writing performance or writing experience for the user.

Therefore, the core body formed of elastomer or other resin, which is made conductive, needs to be thick enough so as not to be deformed easily. Additionally, the circumference of a portion of the core body opposing the opening of the housing needs to be reinforced with harder resin. On the other hand it is generally preferred that the electronic pen be thinned and, accordingly, it is preferable that the core body be thinned as well. The competing considerations, however, make it difficult to thin the core body, to present an obstacle to the thinning of the electronic pen. Further, there is an additional problem that the core body formed of elastomer or other resin made conductive cannot be easily thinned in order to assure conductivity which requires a certain degree of thickness.

Meanwhile, using the core body formed of metal is advantageous in that conductivity is easily maintained even when the core body is thin, and that adequate strength is provided when a pen pressure is applied to the pen tip end of the core body. However, as described above, the core body still needs to be thick in a case where the inclination angle of the electronic pen is to be detected.

Stated differently, for the purpose of detecting the inclination angle of the electronic pen, not only the distal end of the core body but also the trailing end portion adjacent to the distal end needs to have a certain degree of thickness so as to support capacitive coupling with the position sensor no matter whether the core body is formed of elastomer or other resin made conductive or formed of metal.

However, in a case where the thickness of the core body is configured as described above, there arises a problem where the position designated by the electronic pen is affected by the capacitive coupling between the position sensor and the trailing end portion of the core body that continues from the distal end. Therefore, when a straight line is drawn while the electronic pen is inclined obliquely with respect to the input surface, the trace detected by the position detection device may become wavy (because of a waving phenomenon) and not linear.

In view of the above circumstances, according to various exemplary embodiments, an electronic pen is provided that makes it possible to thin the core body in response to a demand for thinner electronic pens, that can detect the inclination angle of the electronic pen, and that avoids the waving phenomenon.

According to various exemplary embodiments, a capacitive electronic pen is provided that includes a housing, a core body, and a peripheral electrode. The housing is cylindrical in shape. The core body is configured such that a distal end thereof protrudes from one opening in the axial direction of the housing, and that a trailing end opposing the distal end in the axial direction is detachably fitted to a core body holder disposed in the hollow space of the housing. The peripheral electrode is positioned near the one opening of the housing and formed of a conductor disposed so as to surround at least a portion of the core body excluding the distal end. The core body includes an electrode core formed of a conductor having a spherical section and a shaft center section. The shaft center section is coupled to the spherical section. The spherical section of the electrode core is not surrounded by the peripheral electrode and is disposed on the distal end protruding from the one opening in the axial direction of the housing. The shaft center section of the electrode core has portions that vary in thickness along the axial direction. Those portions includes a coupling portion that couples to the spherical section and is thinner than the diameter of the spherical section, and a portion that is disposed toward the trailing end of the core body and is thicker than the coupling portion. When the core body is fitted to the core body holder, at least a portion of the shaft center section of the electrode core that is not surrounded by the peripheral electrode is thinner than the diameter of the spherical section of the electrode core.

The electronic pen having the above-described configuration may be configured to detect the inclination angle of the electronic pen, by using the capacitive coupling between the peripheral electrode and the position sensor, instead of using the capacitive coupling between the core body and the position sensor to detect the inclination of the electronic pen. Therefore, the portion continuing from the distal end of the core body need not be made thick in order to detect the inclination of the electronic pen.

In the electronic pen having the above-described configuration, the core body includes the electrode core formed of a conductor having the spherical section and the shaft center section. Further, the electronic pen having the above-described configuration includes the distal end protruding from the one opening of the housing of the electronic pen, and the spherical section of the electrode core formed of a conductor is disposed on the distal end. As the electrode core has a spherical distal end having a spherical shape, the capacitive coupling with the position sensor is uniform irrespective of the inclination of the electronic pen and, as a result, the position detection device is capable of accurately detecting a designated position.

Further, the coupling portion of the shaft center section that couples to the spherical section is thinner than the diameter of the spherical section. Still further, when the core body is fitted to the core body holder in the housing of the electronic pen, at least a portion of the shaft center section of the electrode core that is not surrounded by the peripheral electrode is thinner than the diameter of the spherical section of the electrode core. Therefore, even when the electronic pen is inclined, the above-described configuration reduces the capacitive coupling between the position sensor and at least the portion of the shaft center section of the electrode core that is not surrounded by the peripheral electrode. Consequently, when a straight line is drawn even when the electronic pen is inclined with respect to the input surface, it is possible to reduce the waving phenomenon and thus prevent the straight line from becoming wavy.

DETAILED DESCRIPTION

Figure 1A:
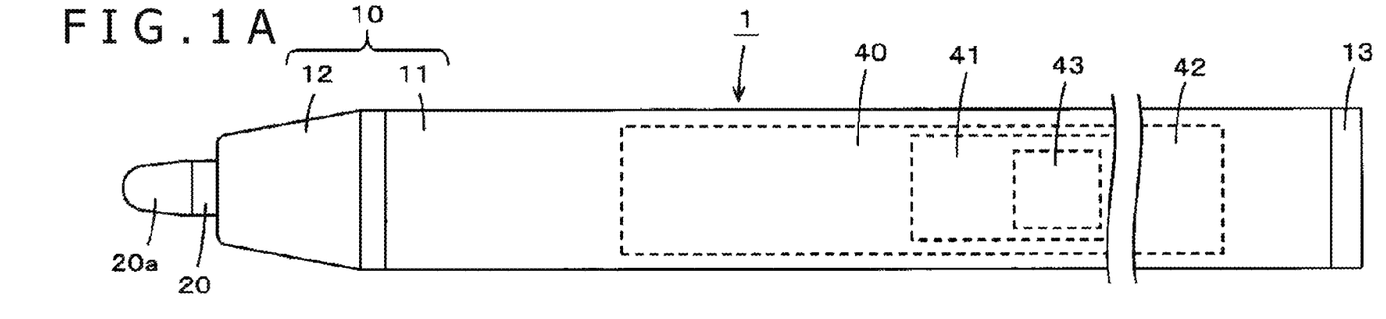
FIGS. 1A and 1B are diagrams illustrating an example configuration of an electronic pen according to an embodiment of the present invention.
Figure 1B:
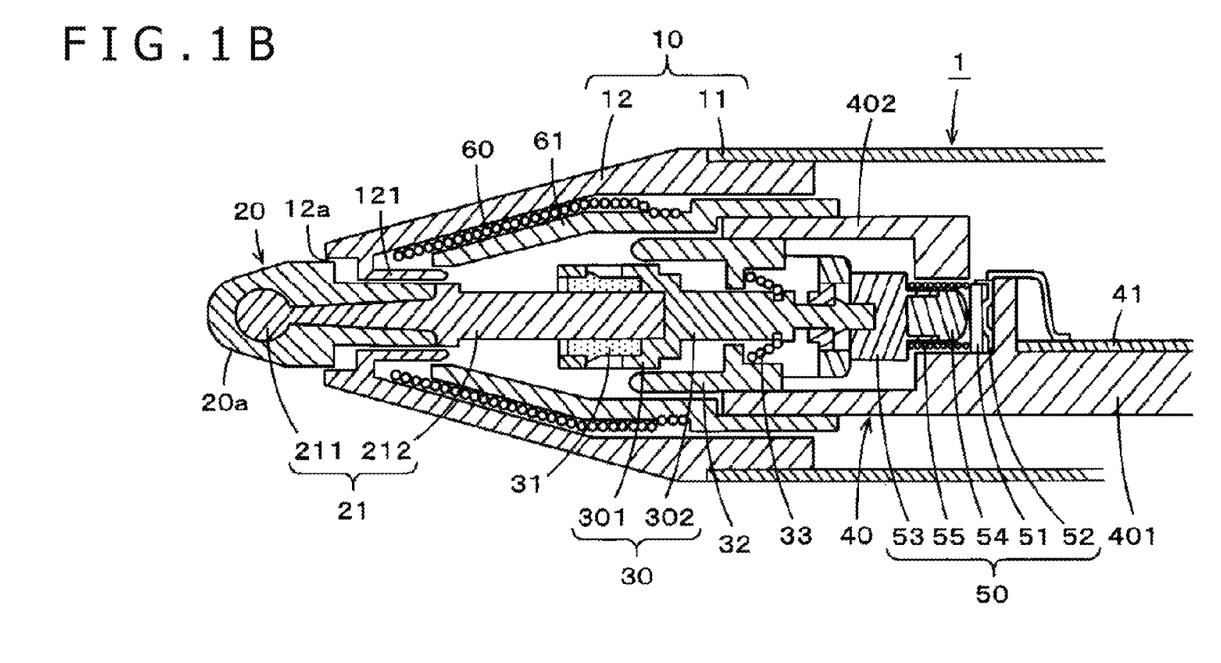

FIGS. 1A and 1B are diagrams illustrating an example configuration of a capacitive electronic pen according to an embodiment of the present invention. FIG. 1A is a diagram illustrating the appearance of a capacitive electronic pen 1 according to the embodiment. FIG. 1B is a longitudinal cross-sectional view illustrating a configuration of certain parts of the capacitive electronic pen 1 according to the embodiment.

As depicted in FIGS. 1A and 1B, a housing 10 of the electronic pen 1 according to the embodiment is configured such that a front cap 12, which is a conically-shaped cylindrical body, is fitted and mounted into an opening in a pen tip end of a cylindrical housing main body section 11. The housing main body section 11 is formed of a conductive material, such as metal, such that the housing main body section 11 is grounded (earth grounded) through a human body when a user holds and operates the electronic pen 1. Further, the front cap 12 is formed of an insulating material, such as resin.

As depicted in FIG. 1B, an opening 12a is formed in the pen tip end, which is a tapered portion of the front cap 12. The opening 12a permits the insertion of a core body 20 such that it can freely move in the axial direction. As described later, the core body 20 is configured to be conductive. The core body 20 is inserted into the housing of the electronic pen 1 through the opening 12a in the front cap 12 such that a distal end 20a of the core body 20 is protruded outward and retained by a later-described core body holder 30. In this instance, the core body 20, which is conductive, and the housing main body section 11, which is formed of a conductive material, are electrically separated (insulated) from each other because the front cap 12 is disposed between them.

As depicted in FIGS. 1A and 1B, a circuit board holder 40 and a battery 42 are accommodated in the hollow space of the housing main body section 11. The circuit board holder 40 is configured such that a printed circuit board 41 is mounted on a circuit board mounting base 401. The battery 42, which acts as a power supply, may be a primary battery or a secondary battery (rechargeable battery). A trailing end of the housing main body section 11, which is positioned opposite the pen tip end of the housing main body section 11, is blocked by a back cap 13 as depicted in FIG. 1A.

The circuit board holder 40, which is formed of insulating resin, includes a pressure-sensitive part retaining section 402. The pressure-sensitive part retaining section 402 is disposed in a longitudinal direction, which is the axial direction of the electronic pen 1, and positioned opposite the circuit board mounting base 401. As depicted in FIG. 1B, the circuit board holder 40 is configured such that the pressure-sensitive part retaining section 402 and the circuit board mounting base 401 are disposed in the longitudinal direction, which is the axial direction of the electronic pen 1, and positioned contiguous (adjacent) to each other when the circuit board holder 40 is accommodated in the hollow space of the housing main body section 11. The pressure-sensitive part retaining section 402, which is cylindrically shaped, has a hollow space for accommodating pressure-sensitive parts 50 (a plurality of pen pressure detection parts). The circuit board mounting base 401 is shaped like a board on which the printed circuit 41 is mounted and retained. The shape of the circuit board mounting base 401 results from cutting a cylindrical body approximately into half.

The pressure-sensitive parts 50 and a pressure transmission member, which are included in a pen pressure detection section, are accommodated in the pressure-sensitive part retaining section 402 of the circuit board holder 40. The pen pressure detection section in the present example includes a variable capacitor, whose capacitance varies in accordance with a pen pressure applied to the core body 20.

As depicted in FIG. 1B, the pressure-sensitive parts 50 in the present example are a plurality of parts including a dielectric 51, a terminal member 52, a retaining member 53, a conductive member 54, and an elastic member 55. The terminal member 52 is formed of a conductive material, such as steel special use stainless (SUS), disposed on one end face of the dielectric 51, which is shaped like a disk, and configured as a first electrode of the variable capacitor formed of the pressure-sensitive parts 50.

The conductive member 54 is formed, for example, of conductive rubber, shaped like a column, and is retained by the retaining member 53. The end face of the conductive member 54 is disposed to oppose the other end face of the dielectric 51. The surface of the conductive member 54 that opposes the dielectric 51 is shaped like a dome, for example.

The elastic member 55 includes a coil spring that is formed of a conductive material such as SUS, and is disposed in such a manner that the conductive member 54 is inserted into the space of the coil spring. The conductive member 54 and the elastic member 55 are electrically connected and configured as a second electrode of the variable capacitor. The elastic member 55 is disposed between the dielectric 51 and the retaining member 53, and configured to constantly press the conductive member 54 in the direction of separating it from the dielectric 51.

A cylindrical section 32 is disposed toward the opening in the pen tip end of the cylindrical pressure-sensitive part retaining section 402 of the circuit board holder 40. The cylindrical section 32 not only engages (secures) the pressure-sensitive parts 50 in the pressure-sensitive part retaining section 402, but also accommodates the core body holder 30.

The core body holder 30 is formed of a conductive material, such as SUS, and is integrally shaped by combining an accommodation fitting section 301 and a rod-shaped section 302. The accommodation fitting section 301 has a hole in which a conductive elastic member 31 is accommodated and fitted. The rod-shaped section 302 fits into the retaining member 53 included in the pressure-sensitive parts 50.

The core body 20 is coupled to and retained by the core body holder 30 when an (proximal) end opposite from the distal end 20a of the core body 20 is fitted to the core body holder 30, which is formed of a conductive material, through the conductive elastic member 31. The rod-shaped section 302 of the core body holder 30, which opposes the core body 20, is fitted to the retaining member 53 included in the pressure-sensitive parts 50 such that the core body 20 and the core body holder 30 are integrally displaced in the axial direction according to the pressure applied to the distal end 20a of the core body 20. As a result, the pressure (pen pressure) applied to the distal end 20a of the core body 20 is transmitted to the pressure-sensitive parts 50.

Consequently, in the present example, the core body holder 30 having the conductive elastic member 31 is configured to function as a pressure transmission member for transmitting the pressure (pen pressure) that is applied to the core body 20 to the pressure-sensitive parts 50.

As depicted in FIG. 1B, a coil spring 33 is disposed in the cylindrical section 32 so as to constantly press the core body holder 30 toward the core body 20. The coil spring 33 is formed of a conductive material, such as conductive metal. Although not depicted in FIGS. 1A and 1B, the coil spring 33 is electrically connected at a first end to the output end of a signal transmission circuit disposed on the printed circuit board 41.

As the core body holder 30 is formed of a conductive material, the core body 20, which is formed of a conductive material and attached to the core body holder 30 via the conductive elastic member 31, is electrically connected via the coil spring 33 to the signal transmission circuit disposed on the printed circuit board 41.

In the electronic pen 1 in the present example, when the pressure (pen pressure) is applied toward the distal end 20a of the core body 20, the core body 20 is displaced in the axial direction toward the inside of the housing main body section 11 of the electronic pen 1. Then, the core body holder 30, to which the core body 20 is fitted, is displaced in the axial direction jointly with the core body 20. This displaces the conductive member 54 toward the dielectric 51 against the elastic force of the elastic member 55 included in the pressure-sensitive parts 50. Then, a contact area between the conductive member 54 and the dielectric 51 varies in accordance with the applied pressure, such that the capacitance of the variable capacitor, which is included in the pen pressure detection section, varies in accordance with the applied pressure. Consequently, the pen pressure can be detected from the capacitance of the variable capacitor included in the pen pressure detection section.

As depicted in FIG. 1B, the electronic pen 1 in the present example is configured such that a peripheral electrode 60 formed of a conductive material is disposed in the front cap 12 in such a manner as to surround a portion of the core body 20 excluding the distal end 20a. In the present example, the peripheral electrode 60 is formed by coiling a conductive metal wire. In the present example, a cylindrically-shaped peripheral electrode retaining section 61 formed of insulating resin is fitted to the pen tip end circumference of the pressure-sensitive part retaining section 402 of the circuit board holder 40. The peripheral electrode retaining section 61 is shaped similarly to the inner wall surface of the front cap 12 such that a space is formed between the peripheral electrode retaining section 61 and the inner wall surface of the front cap 12. As depicted in FIG. 1B, the peripheral electrode 60 is disposed in the space between the circumferential surface of the cylindrically-shaped peripheral electrode retaining section 61 and the inner wall surface of the front cap 12. Although not depicted in FIG. 1B, a coil member included in the peripheral electrode 60 is electrically connected to circuit components on the printed circuit board 41.

A cylindrical section 121 is formed in the hollow space of the front cap 12, which is positioned inward from the opening 12a, and is shaped along the axial direction. The peripheral electrode 60 is electrically separated (insulated) from the conductive core body 20 by the peripheral electrode retaining section 61 and the cylindrical section 121.

Figure 2A:
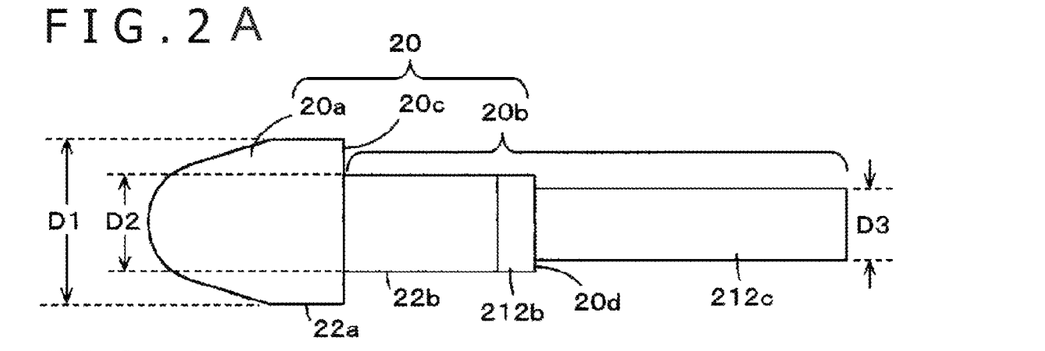
FIGS. 2A and 2B are diagrams illustrating an example configuration of a core body used in the electronic pen according to the embodiment of the present invention.
Figure 2B:
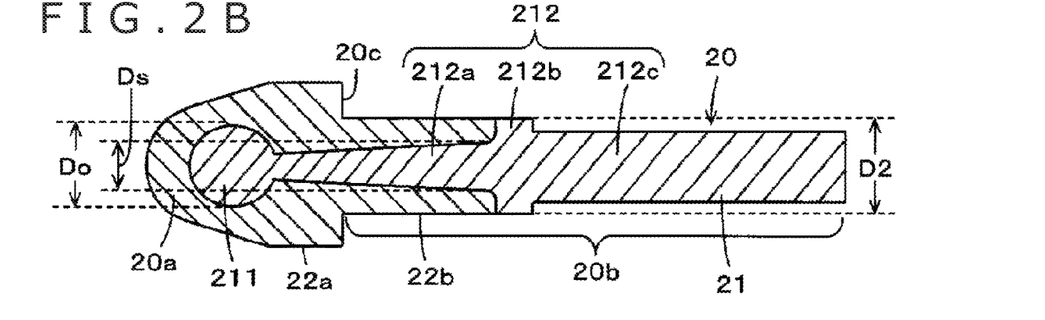

A configuration of the core body 20 will now be described. FIG. 2A is a side view illustrating the appearance of the core body 20. FIG. 2B is a longitudinal cross-sectional view illustrating the core body 20.

As depicted in FIG. 2A, the appearance of the core body 20 in the present example is such that the distal end 20a, which is conically-shaped, is formed on a first axial end of a rod-shaped core body main body section 20b having a circular cross section. In the present example, the diameter D1 of the bottom surface of the cone of the conically-shaped distal end 20a is larger than the diameter of the core body main body section 20b such that a shoulder section 20c is formed between the distal end 20a and the core body main body section 20b.

In the present embodiment, a portion of the core body main body section 20b that is positioned toward the coupling portion that couples to the distal end 20a is shaped like a column having a diameter D2 smaller than the diameter D1 of the bottom surface of the cone of the distal end 20a. Further, a portion of the core body main body section 20b that engages with the retaining member 53 of the pressure-sensitive parts 50 is shaped like a column having a diameter D3 smaller than the diameter D2, so as to correspond to the size of a fitting hole of the retaining member 53. In the present example, therefore, the core body main body section 20b, which includes a column-shaped section having the diameter D2 and a column-shaped section having the diameter D3, is configured such that a shoulder section 20d is formed between these two column-shaped sections.

As depicted in FIGS. 2B and 1B, the core body 20 in the present embodiment includes an electrode core 21 formed of metal as an example of a conductive member, and is configured such that the pen tip end in the axial direction of the electrode core 21 is covered with insulating resin 22. In the present example, hard resin is used as the resin 22 and formed, for example, of polyoxymethylene (POM).

As depicted in FIGS. 2B and 1B, the electrode core 21 includes a spherical section 211 and a shaft center section 212. In the present example, the electrode core 21 is configured as an integral metal object. It is obvious that the spherical section 211 and the shaft center section 212 may be regarded (or configured) as separate members and combined together.

The spherical section 211 of the electrode core 21 is configured to be positioned within the distal end 20a of the core body 20. That is, the spherical section 211 is covered with the resin 22 to form the conically-shaped distal end 20a. In the present embodiment, the distal end 20a is formed of the resin 22 such that a section 22a of the distal end 20a that is positioned toward the side coupling with the core body main body section 20b and has a predetermined length in the axial direction is shaped like a column having the diameter D1. Stated differently, the column-shaped section 22a that has the predetermined length and is positioned toward the side coupling with the core body main body section 20b has a side circumferential surface along the axial direction.

In the present example, the shaft center section 212 of the electrode core 21 includes three portions 212a, 212b, and 212c that are disposed in the axial direction and different in thickness.

As depicted in FIGS. 2B and 1B, the portion 212a includes a coupling portion that couples with the spherical section 211, has a diameter smaller than the diameter Do of the spherical section 211, and is covered with the resin 22. The portion 212a is hereinafter referred to as the electrode core thin shaft center portion. As depicted in FIGS. 2B and 1B, the electrode core thin shaft center portion 212a in the present example is tapered in shape, i.e., thinnest at the coupling portion that couples with the spherical section 211 and gradually increased in diameter with an increase in the distance (i.e., farther away) from the spherical section 211. As depicted in FIG. 2B, the maximum diameter of the electrode core thin shaft center portion 212a in the present example is diameter Ds, which is smaller than the diameter Do of the spherical section.

The vicinity of the coupling portion of the electrode core thin shaft center portion 212a which coupled to the spherical section 211 is within the distal end 20a of the core body 20 and covered with the resin 22 of the distal end 20a. The remaining portion of the electrode core thin shaft center portion 212a is covered with the resin 22 to form a column-shaped section 22b having the diameter D2. In this case, the remaining portion of the electrode core thin shaft center portion 212a is positioned in the vicinity of the center of the column-shaped section 22b having the diameter D2. The circumferential side surface of the column-shaped section 22b having the diameter D2 is formed along the axial direction.

As shown in FIGS. 2A and 2B, the portion 212b is equal in diameter to the column-shaped section 22b having the diameter D2, which is covered with the resin 22, and is exposed without being covered with the resin 22. The portion 212b is hereinafter referred to as the electrode core thick shaft center portion. As depicted in FIGS. 2A and 2B or FIG. 1B, the circumferential side surface of the electrode core thick shaft center portion 212b is flush with the circumferential side surface of the column-shaped section 22b having the diameter D2, which is covered with the resin 22.

As further shown in FIGS. 2A and 2B, the portion 212c, which is exposed without being covered with the resin, forms a column-shaped section that has the diameter D3 and is extended toward the trailing end from the electrode core thick shaft center portion 212b. The portion 212c is hereinafter referred to as the electrode core trailing end portion. As depicted in FIG. 1B, the end of the electrode core trailing end portion 212c is fitted to the core body holder 30 via the conductive elastic member 31.

As described above, the core body holder 30 is electrically connected via the conductive coil spring 33 to the output end of the signal transmission circuit disposed on the printed circuit board 41. Therefore, the output end of the signal transmission circuit disposed on the printed circuit board 41 is electrically connected to the electrode core trailing end portion 212c of the core body 20 via the conductive coil spring 33, the core body holder 30, and the conductive elastic member 31. That is, an output signal from the signal transmission circuit disposed on the printed circuit board 41 is supplied to the electrode core 21 of the core body 20, and a signal is transmitted to a position sensor via capacitive coupling with the spherical section 211 of the electrode core 21.

It should be noted that, as depicted in FIG. 1B, the core body 20 can easily be inserted and fitted into the conductive elastic member 31 accommodated in the core body holder 30, and can easily be pulled out of the core body holder 30 when pulled with a predetermined force.

Figure 3:
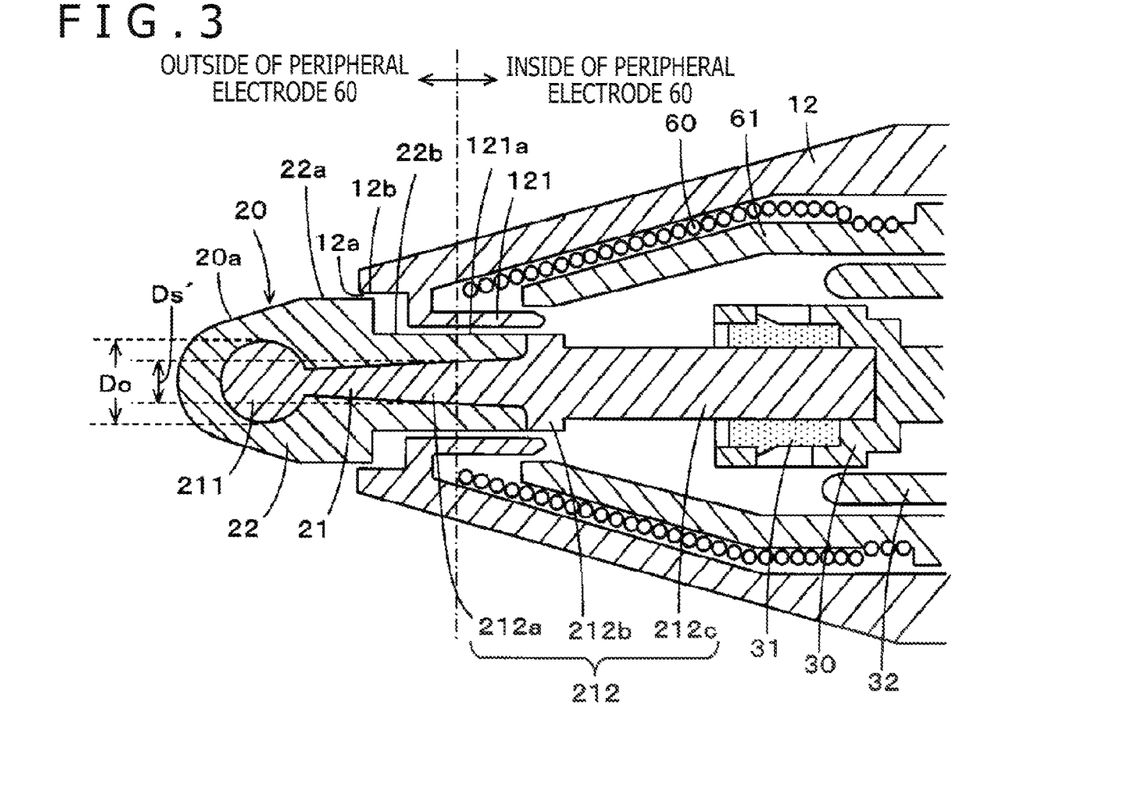
FIG. 3 is a diagram illustrating a configuration of certain parts of the electronic pen according to the embodiment of the present invention.

Referring now to FIG. 3, the following describes the positional relation between the core body 20 and the peripheral electrode 60 and, for example, the relation between the housing 10 and the opening 12a in the front cap 12 of the pen tip end, in a case when the core body 20 is inserted into the housing 10 from the opening 12a in the front cap 12 of the electronic pen 1 and is fitted to the core body holder 30. FIG. 3 is an enlarged longitudinal cross-sectional view illustrating the pen tip end of the capacitive electronic pen 1 according to the present embodiment.

As depicted in FIG. 3 and FIG. 1B, in a state where the core body 20 is fitted to the core body holder 30, the electrode core thick shaft center portion 212b and the electrode core trailing end portion 212c, which are configured such that the electrode core 21 of the core body 20 is exposed to the outside, are positioned within the space covered by the peripheral electrode 60. Further, in the present example, in the section 22b where the electrode core thin shaft center portion 212a is covered with the resin 22 to have the diameter D2, a defined length portion of the electrode core thin shaft center portion 212a on the side that couples with the electrode core thick shaft center portion 212b is positioned within the space covered by the peripheral electrode 60. A portion of the electrode core that is covered by the peripheral electrode 60 is electrostatically shielded by the peripheral electrode 60 and thus is not readily capacitively coupled to the position sensor. Consequently, signals transmitted from this portion of the electrode core 21 of the core body 20 is substantially negligible.

Moreover, although a portion of the core body 20 that is positioned toward the distal end 20a of the electrode core thin shaft center portion 212a is outside the space covered by the peripheral electrode 60, the portion toward the distal end 20a of the electrode core thin shaft center portion 212a has a diameter smaller than the diameter Do of the spherical section 211. Therefore, the portion toward the distal end 20a of the electrode core thin shaft center portion 212a, which is outside the space covered by the peripheral electrode 60, is coupled less strongly as compared to capacitive coupling between the spherical section 211 and the position sensor. Consequently, signals transmitted from this portion of the electrode core 21 of the core body 20 is substantially negligible.

As the electrode core thin shaft center portion 212a is tapered in shape in the present embodiment, the maximum diameter Ds' of the portion of the electrode core thin shaft center portion 212a that is outside the space covered by the peripheral electrode 60 is smaller than the maximum diameter Ds of the electrode core thin shaft center portion 212a. This weakens the capacitive coupling between the tapering portion of the electrode core thin shaft center portion 212a and the position sensor.

As a result, in the electronic pen 1 according to the present embodiment, only the signal transmission from the spherical section 211 at the distal end of the electrode core 21 of the core body 20 becomes dominant with respect to (as sensed from) the position sensor. This makes it possible to reduce a waving phenomenon that is described at the beginning of the present disclosure. Further, as the spherical section 211 is disposed at the distal end of the electrode core 21, it is possible to achieve capacitive coupling with the position sensor without regard to an inclination angle of the electronic pen 1 with respect to an input surface of the position sensor. Consequently, the electronic pen according to the present embodiment has a distinctive technical advantage of being able to not only detect the inclination angle of the electronic pen by using the peripheral electrode 60 as described in detail later, but also to avoid the waving phenomenon in which a linear trace inputted by the distal end 20a of the core body 20 becomes wavy.

Furthermore, in the electronic pen 1 according to the present embodiment, protection against a force obliquely applied to the thinned core body 20 is afforded not only by configuring the core body 20 as described above, but also by improving the configuration of the vicinity of the opening 12a of the front cap 12, which is a part of the housing 10 of the electronic pen 1.

Stated differently, the opening 12a of the front cap 12 is cylindrically formed as depicted in FIG. 3 to form an inner wall surface 12b along the axial direction. In this case, the diameter of the opening 12a is slightly larger than the diameter D1 (see FIG. 2A) of the column-shaped section 22a of the conically-shaped distal end 20a of the core body 20 that is positioned toward the coupling portion that couples with the core body main body section 20b. As depicted in FIG. 3, in a state where the core body 20 is attached to the electronic pen 1, the circumferential side surface of the column-shaped section 22a of the distal end 20a, which has the diameter D1, opposes the inner wall surface 12b of the opening 12a through a void. Therefore, when the electronic pen 1 is inclined with respect to the input surface such that pressure is obliquely applied to the distal end 20a of the core body 20, the circumferential side surface of the column-shaped section 22a of the distal end 20a, which has the diameter D1, abuts against the inner wall surface 12b of the opening 12a, and thus prevents the core body 20 from being significantly distorted.

Moreover, as described above, the cylindrical section 121 is disposed on the inside of the opening 12a of the front cap 12. The inside diameter of the cylindrical section 121 is slightly larger than the maximum diameter D2 of the column-shaped section 22b of the core body main body section 20b. In a state where the core body 20 is fitted to the core body holder 30, the column-shaped section 22b of the core body main body section 20b that is positioned toward the distal end 20a is inserted into the cylindrical section 121.

Consequently, as depicted in FIG. 3, in the state where the core body 20 is attached to the electronic pen 1, the circumferential side surface of the column-shaped section 22b of the core body main body section 20b of the core body 20, which has the diameter D2, opposes an inner wall surface 121a of the cylindrical section 121 through a void. Therefore, when the electronic pen 1 is inclined with respect to the input surface such that pressure is obliquely applied to the distal end 20a of the core body 20, the circumferential side surface of the column-shaped section 22b of the core body main body section 20b, which has the diameter D2, abuts against the inner wall surface 121a of the cylindrical section 121, and thus prevents the core body 20 from being significantly distorted.

In the above case, as depicted in FIG. 3, the inner wall surface 121a of the cylindrical section 121 in the present example is formed over the electrode core thick shaft center portion 212b of the electrode core 21, which is flush with the circumferential side surface of the column-shaped section 22b that is included in the core body main body section 20b and has the diameter D2. Therefore, the core body 20 is protected not only by the column-shaped section 22b of the core body main body section 20b, which is formed of the resin 22 and has the diameter D2, but also by the cylindrical section 121 in the coupling portion that couples with the electrode core thick shaft center portion 212b formed of metal.

The above-described example assumes that a part of the electrode core thin shaft center portion 212a of the electrode core 21 is also covered by the peripheral electrode 60. In the present example, however, the maximum diameter of the electrode core thin shaft center portion 212a is smaller than the diameter Do of the spherical section 211. Therefore, the electrode core thin shaft center portion 212a may be configured to be entirely positioned outside the space covered by the peripheral electrode 60.

Further, the above-described example assumes that the diameter of the electrode core trailing end portion 212c is smaller than the diameter of the electrode core thick shaft center portion 212b. However, the diameter of the electrode core trailing end portion 212c may alternatively be equal to the diameter of the electrode core thick shaft center portion 212b as long as the thickness of the electrode core trailing end portion 212c allows it to be fitted to the core body holder 30.

Example Configuration of Signal Processing Circuit of Electronic Pen 1

Figure 4:
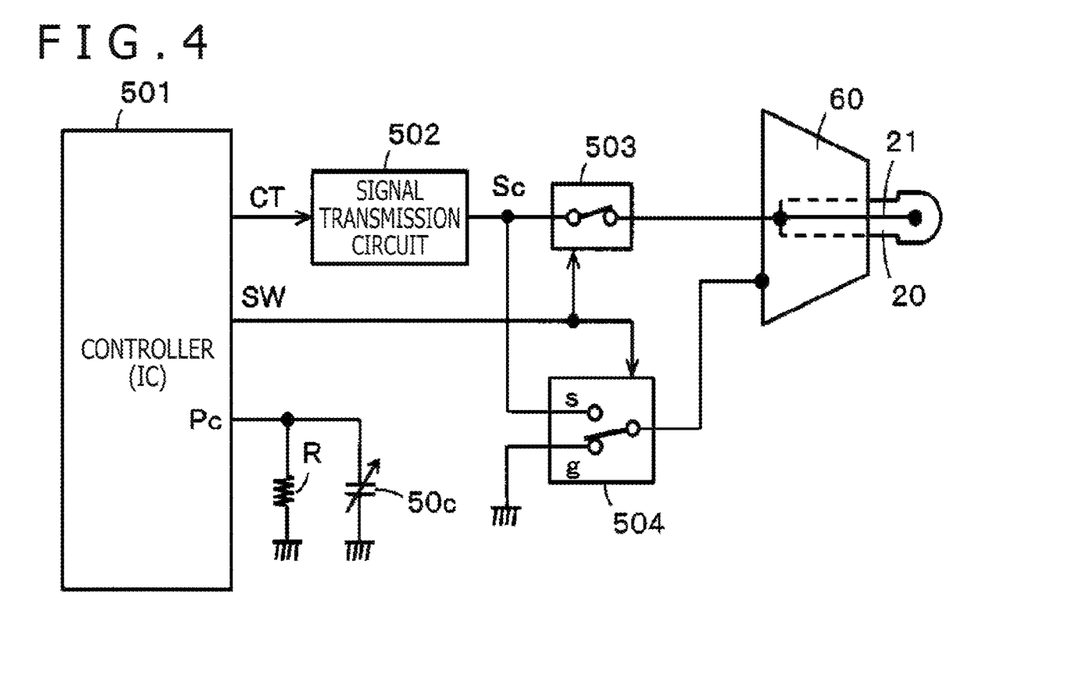
FIG. 4 is a diagram illustrating an example configuration of an electronic circuit of the electronic pen according to the embodiment of the present invention.

FIG. 4 is a block diagram illustrating an example configuration of a signal processing circuit of the electronic pen 1 according to the present embodiment. Specifically, as depicted in FIG. 4, the signal processing circuit of the electronic pen 1 according to the present embodiment includes a controller 501, a signal transmission circuit 502, an open/close switch circuit 503, and a selector switch circuit 504. A terminal Pc of the controller 501 is grounded through a parallel circuit having a variable capacitor 50C and a resistor R, which are included in the pen pressure detection section.

The controller 501 includes, for example, a microprocessor, and is configured as a control circuit for controlling the processing operations of the electronic pen 1. Although not depicted in FIG. 4, a power supply voltage is supplied from the battery 42, which is an example of a drive power supply. The controller 501 functions as a signal supply control circuit, or more specifically, controls the signal transmission circuit 502, and provides switching control for the open/close switch circuit 503 and the selector switch circuit 504.

Further, the controller 501 detects the pen pressure applied to the distal end 20a of the core body 20 of the electronic pen 1 by monitoring capacitance changes in the variable capacitor 50C that occur in accordance to the pen pressure applied to the distal end 20a of the core body 20. In the present embodiment, the controller 501 detects the pen pressure based on the discharge time of the variable capacitor 50C whose capacitance value is based on the pen pressure applied to the distal end 20a of the core body 20.

More specifically, when detecting the pen pressure applied to the distal end 20a of the core body 20, the controller 501 first charges the variable capacitor 50C by setting the terminal Pc at a high level. The terminal Pc is connected to a first end of the variable capacitor 50C. Next, the controller 501 switches the terminal Pc into an input state for monitoring the voltage at the terminal Pc. In this instance, an electric charge stored in the variable capacitor 50C is discharged with a discharge time constant that is determined by the resistor R parallelly connected to the variable capacitor 50C. Then, the voltage across the variable capacitor 50C gradually decreases. The controller 501 determines the time Tp required for the voltage across the variable capacitor 50C to decrease to a predetermined threshold voltage or lower. The time Tp is equivalent to the pen pressure to be determined. The controller 501 determines a multi-bit pen pressure value from the time Tp.

The signal transmission circuit 502 in the present embodiment includes an oscillator circuit that generates an alternative current signal having a predetermined frequency f1, for example, frequency f1 of 1.8 MHz. The controller 501 provides on/off control of the oscillator circuit by supplying a control signal CT to the oscillator circuit included in the signal transmission circuit 502. Therefore, in accordance with the control signal CT from the controller 501, the oscillator circuit included in the signal transmission circuit 502 turns the generated alternative current signal on and off. This causes the signal transmission circuit 502 to generate a signal Sc including an amplitude-shift keying (ASK) modulated signal. That is, when the controller 501 controls the oscillator circuit included in the signal transmission circuit 502, the signal transmission circuit 502 generates the ASK modulated signal. Instead of the ASK modulated signal, the signal transmission circuit 502 may generate an on-off keying (OOK) modulated signal, a frequency-shift keying (FSK) modulated signal, or another modulated signal.

The signal Sc from the signal transmission circuit 502 is amplified by an unillustrated amplifier, then, in the present embodiment, supplied to the electrode core 21 of the core body 20 through the open/close switch circuit 503, and supplied also to one fixed terminal s of the selector switch circuit 504. The other fixed terminal g of the selector switch circuit 504 is grounded. A movable terminal of the selector switch circuit 504 is connected to the peripheral electrode 60.

Further, a selector control signal SW supplied from the controller 501 provides on/off control of the open/close switch circuit 503, and switches the selector switch circuit 504 between the fixed terminal s and the fixed terminal g.

Figure 5A:
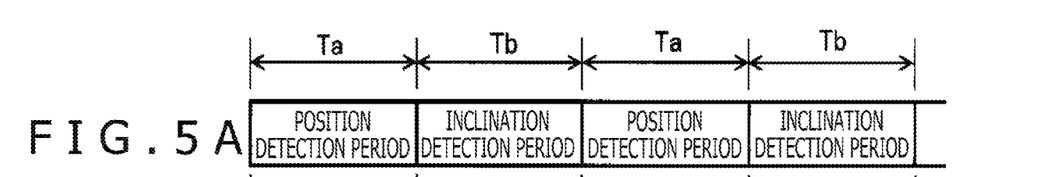
FIGS. 5A and 5B are diagrams illustrating an example of operation performed by the electronic circuit depicted in FIG. 4.
Figure 5B:
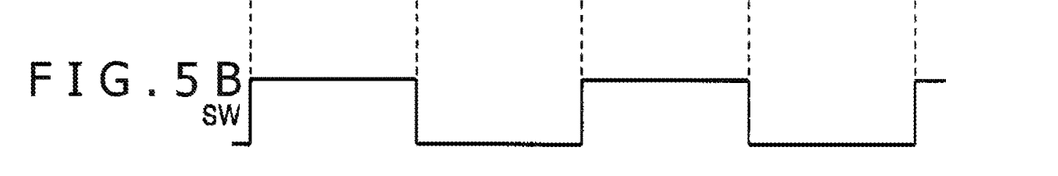

In the electronic pen 1 according to the present embodiment, the signal processing circuit is configured such that the controller 501 exercises control to execute a position detection period Ta and an inclination detection period Tb alternately in a time-division manner as depicted in FIG. 5A. Switching control between the position detection period Ta and the inclination detection period Tb is provided when the selector control signal SW from the controller 501 exercises switching control of the open/close switch circuit 503 and the selector switch circuit 504 as depicted in FIG. 5B.

In the position detection period Ta, the signal processing circuit operates in such a manner that the selector control signal SW from the controller 501 turns on the open/close switch circuit 503 so as to connect the output end of the signal transmission circuit 502 to the electrode core 21 of the core body 20, and switches the selector switch circuit 504 to the fixed terminal g in order to ground the peripheral electrode 60.

Further, in the position detection period Ta, the signal transmission circuit 502 generates a position detection signal and pen pressure information in accordance with the control signal CT from the controller 501, and the generated position detection signal and pen pressure information are transmitted from the electrode core 21 of the core body 20. The position detection signal is a continuous-wave signal (burst signal) having the frequency f1. Meanwhile, the pen pressure information is an ASK signal that is obtained when the signal having the frequency f1 is modulated by information regarding the multi-bit pen pressure value, which is detected and acquired by the controller 501 in the manner described above. Further, in the position detection period Ta described in conjunction with the present example, the electrode core 21 of the core body 20 first transmits the position detection signal, and then transmits the pen pressure information.

In the position detection period Ta, the peripheral electrode 60 is grounded. Therefore, a portion of the electrode core 21 of the core body 20 that exists in the space covered by the peripheral electrode 60 is electrostatically shielded, to avoid being capacitively coupled to the position sensor. A portion of the electrode core 21 of the core body 20 that exists outside the space covered by the peripheral electrode 60 is not electrostatically shielded. However, this portion includes the spherical section 211 and the electrode core thin shaft center portion 212a of the electrode core 21, and only the spherical section 211 is substantially coupled capacitively with the position sensor. As a result, the position detection device is capable of accurately detecting a position designated by the electronic pen 1, while significantly weakening any capacitive coupling with a portion other than the spherical section 211, to thereby reduce the waving phenomenon.

Next, in the inclination detection period Tb, the selector control signal SW from the controller 501 turns off the open/close switch circuit 503 so as to disconnect the output end of the signal transmission circuit 502 from the electrode core 21 of the core body 20, and switches the selector switch circuit 504 to the fixed terminal s in order to connect the output end of the signal transmission circuit 502 to the peripheral electrode 60.

Further, in the inclination detection period Tb, the signal transmission circuit 502 generates an inclination detection signal in accordance with the control signal CT from the controller 501. The generated inclination detection signal is a continuous-wave signal (burst signal) having the frequency f1, which is similar to the position detection signal. It should be noted that, in the inclination detection period Tb, too, the pen pressure information (ASK signal) may be generated subsequently to the inclination detection signal.

Consequently, in the inclination detection period Tb, the inclination detection signal is transmitted to the position sensor through the peripheral electrode 60. The position detection device detects the inclination angle of the electronic pen 1 based on a detection signal acquired through the position sensor.

Referring now to FIGS. 6A to 6F, the following describes a method that is used by the position detection device to detect the inclination angle of the electronic pen 1.

Figure 6A:
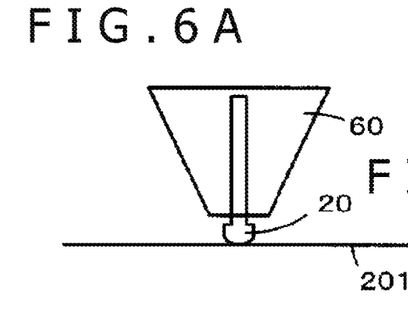
FIGS. 6A to 6F are diagrams illustrating an inclination detection operation performed by the electronic pen according to the embodiment of the present invention.
Figure 6B:
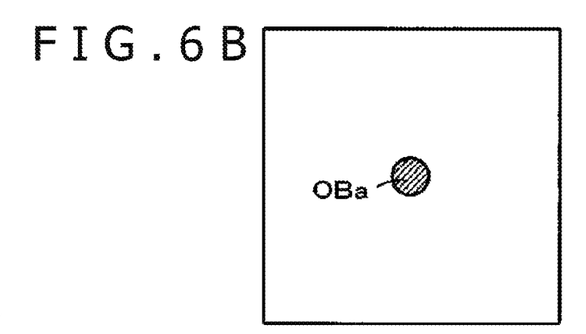
Figure 6C:
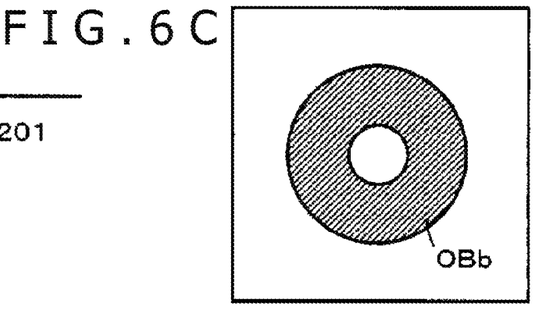

When the core body 20 of the electronic pen 1 is perpendicular to the input surface of a position sensor 201 as depicted in a schematic diagram of FIG. 6A, capacitive coupling occurs between the position sensor 201 and the electrode core 21 of the core body 20 in the position detection period Ta, and a region OBa where the capacitive coupling occurs is a perfectly circular region as depicted in FIG. 6B. Meanwhile, in the inclination detection period Tb, capacitive coupling occurs between the position sensor 201 and the peripheral electrode 60, and a region OBb where the capacitive coupling occurs is a ring-shaped region as depicted in FIG. 6C.

Figures 6D, 6E, 6F:
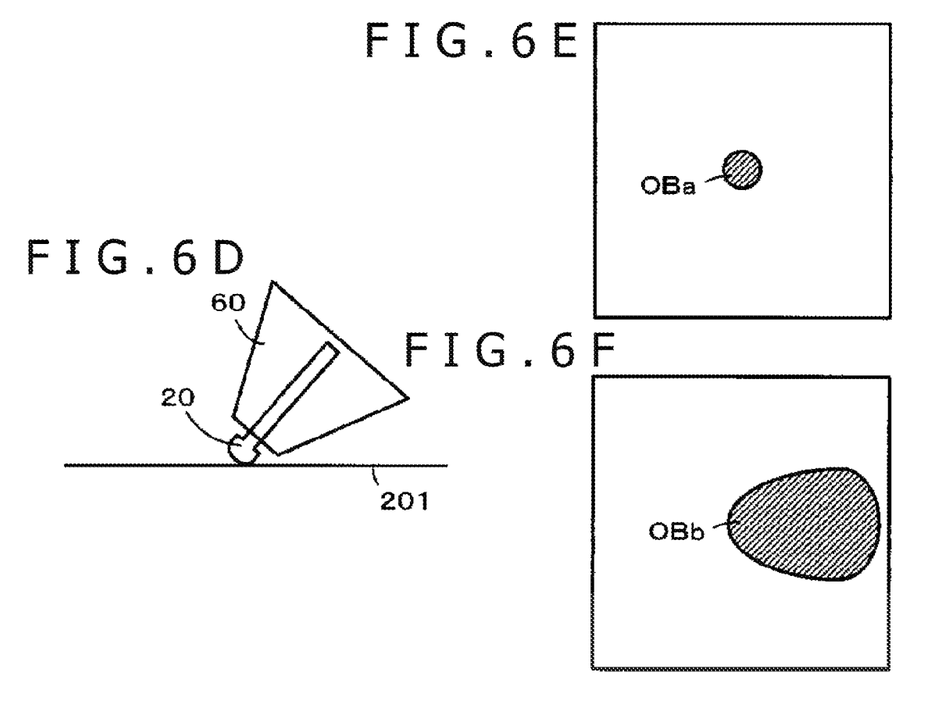

Further, when the core body 20 of the electronic pen 1 is inclined with respect to the input surface of the position sensor 201 as depicted in a schematic diagram of FIG. 6D, the region OBa where capacitive coupling occurs between the position sensor 201 and the electrode core 21 of the core body 20 in the position detection period Ta substantially remains a perfectly circular region as depicted in FIG. 6E. Meanwhile, the region OBb where the capacitive coupling occurs between the position sensor 201 and the peripheral electrode 60 in the inclination detection period Tb is an elliptical region that is based on the inclination angle and elongated in the direction of inclination as depicted in FIG. 6F.

Consequently, the position detection device is able to detect the magnitude of the inclination angle of the electronic pen 1 from the longitudinal length of the elliptical region OBb depicted in FIG. 6F. Further, the position detection device is able to detect the direction of inclination of the electronic pen 1 by detecting the longitudinal direction of the elliptical region OBb starting from a position designated by the electronic pen 1, which is depicted in FIG. 6E.

It should be noted that, in the example of FIG. 4, the signal having the frequency f1, which is supplied to the electrode core 21 of the core body 20, is used for the peripheral electrode 60 configured to detect the inclination angle. Alternatively, however, the signal supplied to the electrode core 21 of the core body 20 may differ in frequency from the signal supplied to the peripheral electrode 60. When such an alternative is used, the position detection device is able to distinguish between the signal from the electrode core 21 and the signal from the peripheral electrode 60. Therefore, the signal from the electrode core 21 and the signal from the peripheral electrode 60 may be simultaneously transmitted to the position sensor instead of repeating the position detection period and the inclination detection period in the time-division manner as described above.

Example Alternative Configurations of Core Body and Electrode Core

Figure 7A:
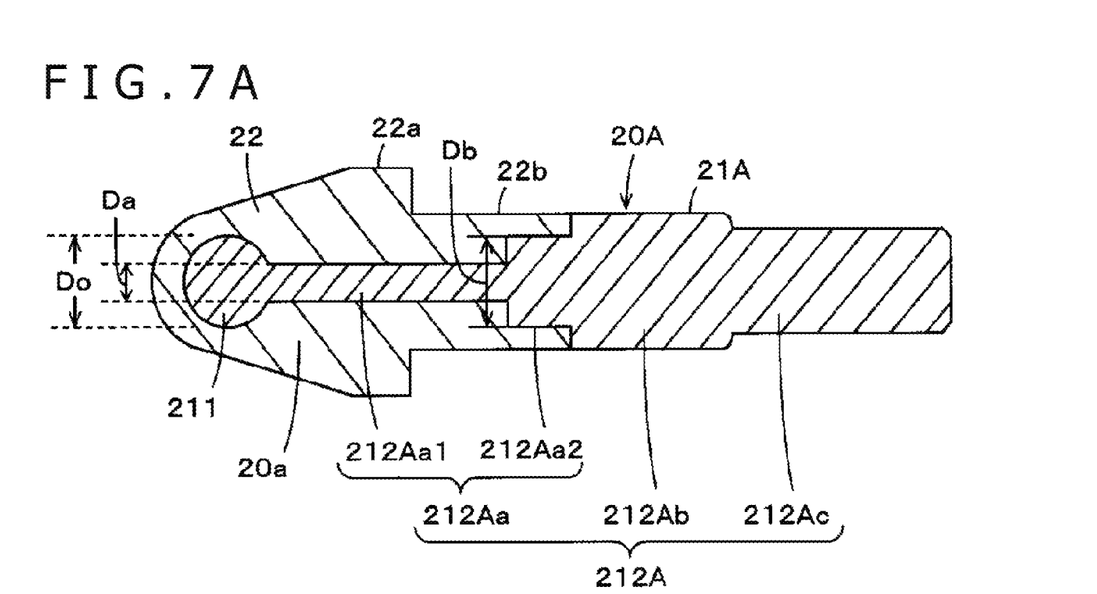
FIGS. 7A and 7B are diagrams illustrating alternative example configurations of the core body used in the electronic pen according to an embodiment of the present invention.

The electrode core 21 of the core body 20 according to the previous embodiment is configured such that the electrode core thin shaft center portion 212a is tapered in shape. However, the electrode core thin shaft center portion 212a is not limited to a tapered shape. FIG. 7A depicts a core body 20A having such an example alternative configuration. Elements identical to those of the core body 20 according to the previous embodiment are designated by the same reference numerals as the corresponding elements. An electrode core thin shaft center portion 212Aa of an electrode core 21A in the present example includes a thinnest portion 212Aa1 and a medium-thick portion 212Aa2. The thinnest portion 212Aa1 has a diameter Da and is positioned toward the coupling portion that couples to the spherical section 211. The medium-thick portion 212Aa2 has a diameter Db and is positioned toward the coupling portion that couples to an electrode core thick shaft center portion 212Ab. The diameter Db is larger than the diameter Da and smaller than the diameter D2 of the electrode core thick shaft center portion 212Ab. It should be noted that the electrode core thick shaft center portion 212Ab and an electrode core trailing end portion 212Ac of the present embodiment have the same diameter as the electrode core thick shaft center portion 212b and electrode core trailing end portion 212c of the electrode core of the previously described embodiment, respectively, except that they have different axial lengths as compared with their counterparts in the previously described embodiment.

In a case where the medium-thick portion 212Aa2 is configured to exist in the space covered by the peripheral electrode 60, the diameter of the medium-thick portion 212Aa2 may be made equal to or greater than the diameter Do of the spherical section 211. Even in the case of the tapered electrode core thin shaft center portion 212a of the core body 20 in the previous embodiment, a portion of the electrode core thin shaft center portion 212a that is positioned toward the electrode core thick shaft center portion 212b may have a diameter equal to or greater than the diameter Do of the spherical section 211 when the electrode core thick shaft center portion 212b is configured to exist in the space covered by the peripheral electrode 60.

Figure 7B:
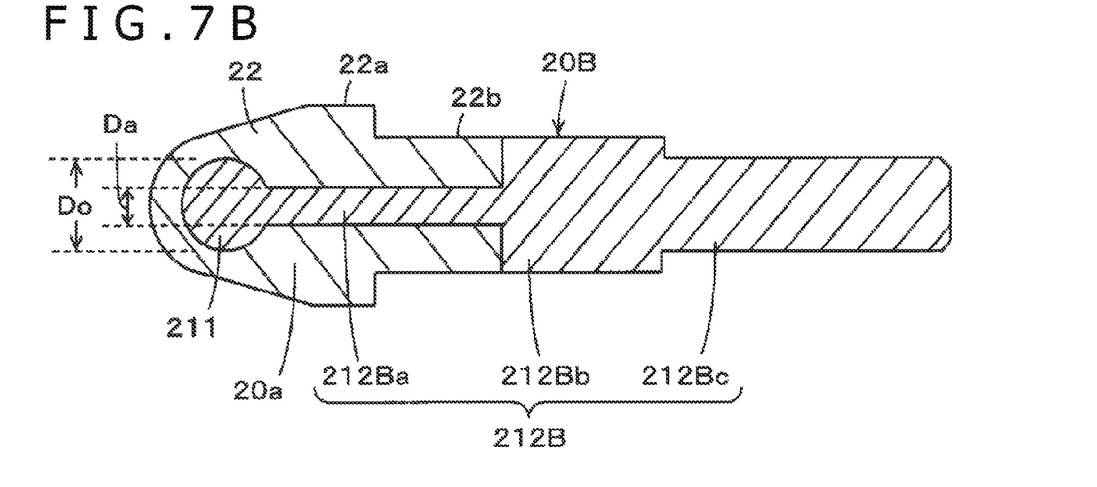

FIG. 7B depicts a core body 20B having another example alternative configuration. In the present example, too, elements identical to those of the core body 20 according to the previous embodiment are designated by the same reference numerals as the corresponding elements. An electrode core thin shaft center portion 212Ba of an electrode core 21B in the present example is such that the entire portion between the coupling portion that couples to the spherical section 211 and an electrode core thick shaft center portion 212Bb has the diameter Da, which is smaller than the diameter Do of the spherical section 211. In the other respects, the present example is similar to the previous embodiment.

It should be noted that, in the above example of the core body, the electrode core thick shaft center portion and the electrode core trailing end portion, which are included in the electrode core and not covered with the resin, differ in thickness. Alternatively, however, the electrode core thick shaft center portion and the electrode core trailing end portion may be equal in thickness.

Further, in the previous embodiment, the electrode core thick shaft center portion is flush with and equal in diameter to a portion of the resin 22 that covers the electrode core thin shaft center portion. However, when the coupling portion between the electrode core thin shaft center portion and the electrode core thick shaft center portion is positioned closer to the trailing end than the cylindrical section 121 and is not positioned to oppose a wall surface 212a of the cylindrical section 121, the electrode core thick shaft center portion may differ in diameter from the resin 22 covering the electrode core thin shaft center portion.

Alternative Embodiment and Modifications

In the electronic pen according to the previous embodiments, the peripheral electrode 60 is configured to be formed of a conductive coil spring. However, the peripheral electrode 60 is not limited to such a configuration. Alternatively, the peripheral electrode 60 may be formed of any cylindrically-shaped conductive material.

Further, the peripheral electrode 60 in the previous embodiments is formed of a single part. Alternatively, however, the peripheral electrode 60 may be formed of a plurality of conductive members separated from each other in the circumferential direction.

Furthermore, in the previous embodiments, the pressure-sensitive parts of the pen pressure detection section are configured to form a variable capacitor by sandwiching the dielectric between a terminal member and a conductive member. Alternatively, however, the pressure-sensitive parts may be configured by using a semiconductor element that is configured as a variable capacitor formed of micro-electro-mechanical systems (MEMS) whose capacitance varies according to a pen pressure as disclosed, for example, in Japanese Patent Laid-open No. 2013-161307.

Moreover, in the previous embodiments, a conductive coil spring is used to electrically connect the electrode core of the core body to the circuit on the printed circuit board. However, the electrical connection to the circuit on the printed circuit board is not limited to such a connection. An alternative configuration may be formed by electrically connecting the circuit on the printed circuit board to the core body holder to which the electrode core trailing end portion of the core body is fitted, or by electrically connecting the circuit on the printed circuit board to the electrode core trailing end portion of the core body.

Additionally, the previous embodiments have been described on the assumption that the core body has a circular cross-section. Alternatively, however, the core body may have a polygonal cross-section instead of the circular cross-section.

In addition, the electrode core of the core body in the previous embodiments is formed of metal. However, the electrode core of the core body need not always be formed of metal, and may alternatively be formed of a hard non-metallic material.

It should be understood by those skilled in the art that various modifications, combinations, sub-combinations and alterations are possible depending on design requirements and other factors insofar as they are within the scope of the appended claims or the equivalents thereof.

The invention claimed is:

1. A capacitive electronic pen, comprising:
   a housing that is cylindrical in shape;
   a core body that has a distal end and a trailing end, the distal end protruding from one opening in an axial direction of the housing, the trailing end being at an opposite end from the distal end in the axial direction, and the core body being detachably fitted to a core body holder disposed in a hollow space of the housing; and
   a peripheral electrode that is positioned near the one opening of the housing and formed of a conductor disposed so as to surround at least a portion of the core body excluding the distal end,
   wherein the core body includes an electrode core formed of a conductor having a spherical section and a shaft center section, the shaft center section having:
      a first section having a first diameter and physically directly connected to the spherical section,
      a second section having a second diameter greater than the first diameter and physically directly connected to the first section, such as to form a first step between the second section and the first section, and
      a third section having a third diameter greater than the second diameter and physically directly connected to the second section, such as to form a second step between the third section and the second section;
   wherein, when the core body is fitted to the core body holder, the first diameter of at least a portion of the first section that is not surrounded by the peripheral electrode is smaller than a diameter of the spherical section.

2. The capacitive electronic pen according to claim 1, wherein resin covers the spherical section of the electrode core and the at least a portion of the first section that is not surrounded by the peripheral electrode.

3. The capacitive electronic pen according to claim 1, wherein the spherical section of the electrode core is disposed on the distal end that protrudes from the one opening of the housing.

4. The capacitive electronic pen according to claim 1, wherein the at least a portion of the first section tapers toward the spherical section.

5. The capacitive electronic pen according to claim 1, wherein the first diameter of the at least a portion of the first section is a fixed diameter.

6. The capacitive electronic pen according to claim 1, wherein a portion of the electrode core that is positioned toward the trailing end is exposed without being covered with resin and is electrically connected to a signal output end of a signal generation circuit disposed in the housing.

7. The capacitive electronic pen according to claim 1, wherein a portion of the electrode core that is positioned toward the trailing end is exposed without being covered with resin and is fitted to the core body holder formed of a conductor, and the core body holder is electrically connected to a signal output end of a signal generation circuit disposed in the housing.

8. The capacitive electronic pen according to claim 1,
wherein resin covers the spherical section of the electrode core and the at least a portion of the first section that is not surrounded by the peripheral electrode, and
an inner wall surface is formed on the one opening of the housing, the inner wall surface facing a circumferential side surface of the resin covering the at least a portion of the first section.

9. The capacitive electronic pen according to claim 8,
wherein the core body is axially displaceable in the hollow space of the housing according to a pressure applied to the distal end, and
the inner wall surface and the circumferential side surface of the resin covering the at least a portion of the first section are formed along the axial direction.

10. The capacitive electronic pen according to claim 8,
wherein a portion of the electrode core that is positioned toward the training end is exposed without being covered with resin and has a circumferential side surface that is flush with the circumferential side surface of the resin covering the at least a portion of the first section, and
the inner wall surface of the opening in the housing faces the circumferential side surface of the resin including a portion of the resin that couples with the exposed portion of the electrode core.

11. The capacitive electronic pen according to claim 1,
wherein resin covers the spherical section of the electrode core and the at least a portion of the first section that is not surrounded by the peripheral electrode, and a portion of resin that covers the spherical section is thicker than a portion of resin that covers the at least a portion of the first section, and
an inner wall surface is formed in the one opening of the housing to face a circumferential side surface of the portion of resin that covers the spherical section.

12. The capacitive electronic pen according to claim 11,
wherein the core body is axially displaceable in the hollow space of the housing according to a pressure applied to the distal end, and
the inner wall surface and the circumferential side surface of the portion of resin that covers the spherical section are formed along the axial direction.

13. The capacitive electronic pen according to claim 1,
a pen pressure detector is disposed in the housing and positioned proximal to the core body holder toward the trailing end, and
the core body holder acts as a transmission member for transmitting, to the pen pressure detector, the pressure applied to the distal end of the core body.

14. The capacitive electronic pen according to claim 1, wherein the spherical section and the shaft center section of the electrode core are formed of metal.

\* \* \* \* \*